(12) United States Patent
Lu et al.

(10) Patent No.: US 12,222,157 B2
(45) Date of Patent: Feb. 11, 2025

(54) REFRIGERATOR AND A CONTROL METHOD

(71) Applicant: HISENSE VISUAL TECHNOLOGY CO., LTD., Shandong (CN)

(72) Inventors: Kejing Lu, Shandong (CN); Bei Yan, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 217 days.

(21) Appl. No.: 17/940,574

(22) Filed: Sep. 8, 2022

(65) Prior Publication Data

US 2023/0003440 A1 Jan. 5, 2023

Related U.S. Application Data

(63) Continuation of application No. PCT/CN2020/108272, filed on Aug. 10, 2020.

(30) Foreign Application Priority Data

Jul. 1, 2020 (CN) .......................... 202010621319.1
Jul. 1, 2020 (CN) .......................... 202010621320.4
Jul. 1, 2020 (CN) .......................... 202010627025.X

(51) Int. Cl.
*F25D 29/00* (2006.01)
*F25D 23/02* (2006.01)

(52) U.S. Cl.
CPC ............ *F25D 29/005* (2013.01); *F25D 23/02* (2013.01); *F25D 2400/36* (2013.01); *F25D 2700/08* (2013.01)

(58) Field of Classification Search
CPC ........ F25D 23/02; F25D 29/00; F25D 29/005; F25D 2400/36; F25D 2500/06; F25D 2700/02; F25D 2700/08
See application file for complete search history.

(56) References Cited

U.S. PATENT DOCUMENTS 5,798,694 A * 8/1998 Reber .................. G06K 7/0008
  374/102
7,716,935 B2 * 5/2010 Kim ........................ F25D 29/00
  236/51

(Continued)

FOREIGN PATENT DOCUMENTS

CN       202281453 A       6/2012
CN       104061747 A       9/2014
(Continued)

OTHER PUBLICATIONS

English translation of the First Office Action issued in CN202010621320.4, mailed Feb. 24, 2021.

(Continued)

*Primary Examiner* — Marc E Norman
(74) *Attorney, Agent, or Firm* — ANOVA LAW GROUP, PLLC

(57) ABSTRACT

A refrigerator and a control method. The method includes: in response to one or more doors corresponding to one or more storage compartments of a refrigerator being all detected to be closed, obtaining a first of information; determining, by comparing the first set of information with a second set of information, one or more target tags placed in a first storage compartment of the one or more storage compartments, and determining one or more target placement times corresponding to the one or more target tags according to a current time, wherein the second set of information is an information set generated according to identity information of each RFID tag in the one or more storage compartments obtained in response to that the doors are detected to be closed last time immediately before this closing of the doors.

14 Claims, 12 Drawing Sheets

(56) References Cited

U.S. PATENT DOCUMENTS

| | | | |
|---|---|---|---|
| 9,710,754 B2* | 7/2017 | Kaye | G06Q 10/08 |
| 10,724,757 B2* | 7/2020 | Froehlich | F25D 29/003 |
| 2002/0066279 A1 | 6/2002 | Kiyomatsu | |
| 2004/0100380 A1* | 5/2004 | Lindsay | G06K 19/0717 |
| | | | 340/572.1 |
| 2016/0162715 A1* | 6/2016 | Luk | F25D 29/00 |
| | | | 235/385 |
| 2018/0239319 A1* | 8/2018 | Abdoo | G05B 15/02 |
| 2023/0221066 A1* | 7/2023 | Kong | G06F 3/167 |

FOREIGN PATENT DOCUMENTS

| | | | |
|---|---|---|---|
| CN | 104197633 A | 12/2014 | |
| CN | 104374159 A | 2/2015 | |
| CN | 105423698 A | 3/2016 | |
| CN | 205425605 A | 8/2016 | |
| CN | 106127542 A | 11/2016 | |
| CN | 106288635 A | 1/2017 | |
| CN | 106969593 A | 7/2017 | |
| CN | 107862354 A | 3/2018 | |
| CN | 110245724 A | 9/2019 | |
| CN | 110245725 A | 9/2019 | |
| CN | 111336747 A | 6/2020 | |
| JP | 2002081848 A | 3/2002 | |
| JP | 2002156181 A | 5/2002 | |
| JP | 2010277493 A | 12/2010 | |
| KR | 20080001389 A | 1/2008 | |
| KR | 20080012117 A | 2/2008 | |
| KR | 20090020935 A | 2/2009 | |
| WO | WO-2019171262 A1 * | 9/2019 | G06K 17/0022 |

OTHER PUBLICATIONS

English translation of the Second Office Action issued in CN202010621320.4, mailed Sep. 13, 2021.

* cited by examiner

REFRIGERATOR AND A CONTROL METHOD

CROSS REFERENCE TO RELATED APPLICATIONS

This application is a continuation application of PCT/CN2020/108272, which claims the priorities to Application No. CN202010621320.4 filed on Jul. 1, 2020, No. CN202010621319.1 filed on Jul. 1, 2020, and No. CN202010627025.X filed on Jul. 1, 2020, each of which is incorporated herein in its entirety by reference.

FIELD

The present application relates to the field of refrigerator technology, in particular to a refrigerator and a control method for a refrigerator.

BACKGROUND

Foods stored in a multi-storage-compartment refrigerator with a radio frequency identification (RFID) function can be intelligently managed.

For example, with an antenna arranged in a freezer compartment and connected with an RFID detection module, the RFID detection module can detect an RFID tag attached to a food in the freezer compartment by means of the antenna in the freezer compartment, and obtain food information associated with the RFID tag. The food information includes an identity for indicating the kind of the food. In this way, the refrigerator will know what foods are stored in the freezer compartment.

SUMMARY

The present application provides a refrigerator and a control method for a refrigerator.

Embodiments of the application provide a refrigerator, comprising: one or more storage compartments, configured to store foods, wherein the foods are identified by radio frequency identification (RFID) tags; one or more doors corresponding to the one or more storage compartments, provided at one or more openings of the one or more storage compartments; one or more RFID detection circuits in the one or more storage compartments, configured to detect signals from the RFID tags; one or more display panels on the one or more doors, configured to display an image and a user interface; a controller in communication with the one or more display panels, configured to: obtain, in response to that the one or more doors are detected to be closed, a first set of information, wherein the first set of information comprises identity information of each RFID tag in the one or more storage compartments; determine, by comparing the first set of information with a second set of information, one or more target tags placed in a first storage compartment of the one or more storage compartments, and determine one or more target placement times corresponding to the one or more target tags according to a current time, wherein the second set of information is an information set generated according to identity information of each RFID tag in the one or more storage compartments obtained in response to that all the doors are detected to be closed last time immediately before this time of all doors closing; and display a first user interface, wherein a freshness indicator of one or more foods identified by the one or more target tags on the first user interface is generated according to the one or more target placement times corresponding to the one or more target tags.

Embodiments of the application provide a control method for a refrigerator, comprising: obtaining, in response to that one or more doors corresponding to one or more storage compartments of the refrigerator are detected to be closed, a first set of information, wherein the first set of information comprises identity information of each RFID tag in the one or more storage compartments, and the one or more doors is provided at one or more openings of the one or more storage compartments; determining, by comparing the first set of information with a second set of information, one or more target tags placed in a first storage compartment of the one or more storage compartments, and determining one or more target placement times corresponding to the one or more target tags according to a current time, wherein the second set of information is an information set generated according to identity information of each RFID tag in the one or more storage compartments obtained in response to that all the doors are detected to be closed last time immediately before this time of all doors closing; and displaying a first user interface, wherein a freshness indicator of one or more foods identified by the one or more target tags on the first user interface is generated according to the one or more target placement times corresponding to the one or more target tags.

DETAILED DESCRIPTION OF THE EMBODIMENTS

In order to enable those skilled in the art to better understand the present application, the embodiments of the present application will be described below clearly and comprehensively in conjunction with accompanying drawings of the embodiments of the present application. Apparently, the embodiments described are merely some rather than all of the embodiments of the present application. Based on the embodiments of the present application, all other embodiments obtained by those of ordinary skill in the art without making creative efforts shall fall within the protection scope of the present application.

In the specification of the present application, it is appreciated that the orientation or positional relationships indicated by the terms "center", "up", "down", "front", "rear", "left", "right", "vertical", "horizontal", "top", "bottom", "inside", "outside", etc. are based on the orientation or positional relationship shown in the accompanying drawings, are merely for facilitating the description of the present application and simplifying the description, rather than indicating or implying that an apparatus or element referred to must have a particular orientation or be constructed and operated in a particular orientation, and therefore will not be interpreted as limiting the present application.

Figure 1:
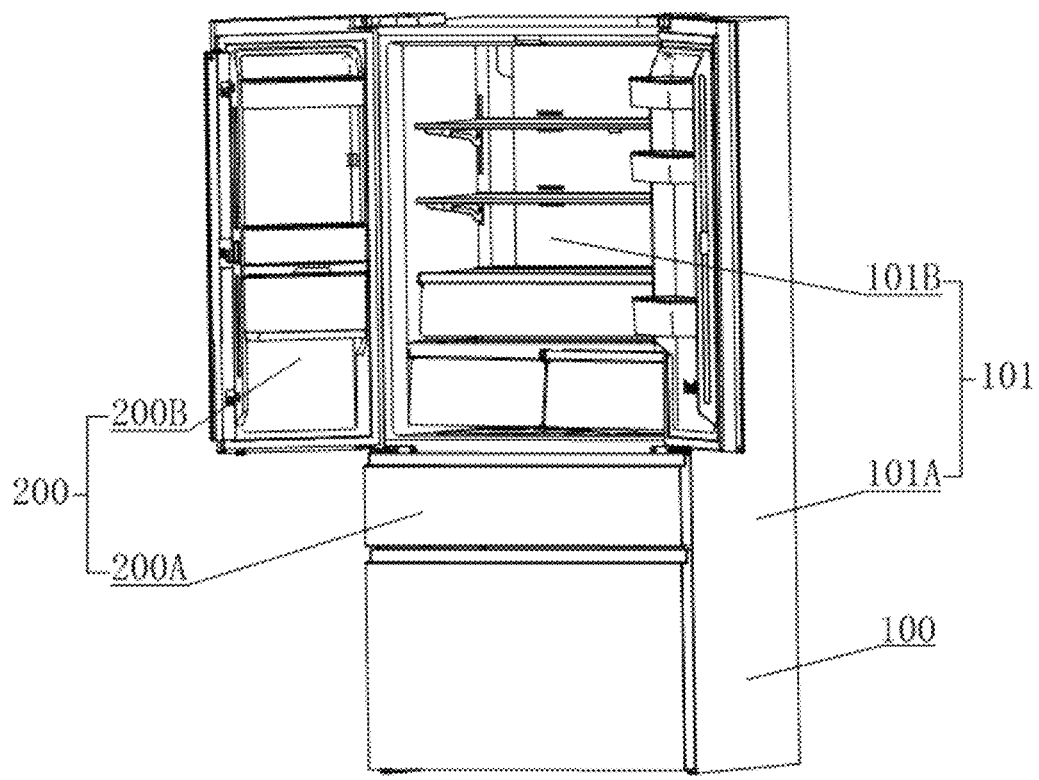
FIG. 1 shows a diagram of a refrigerator according to an exemplary embodiment of the present application.

FIG. 1 shows a diagram of a refrigerator according to an exemplary embodiment of the present application. The refrigerator according to an embodiment of the present application is approximately a cuboid. The refrigerator comprises one or more storage compartments 101 for providing a limited storage space and one or more doors 200 arranged at one or more openings of the one or more storage compartments 101. The storage compartment 101 is in a shape of cabinet 100 and has an opening. In the embodiment shown in FIG. 1, the one or more storage compartment 101 include a freezer compartment 101A in the lower portion of the refrigerator and a refrigerator compartment 101B in the upper portion of the refrigerator. The freezer compartment 101A and the refrigerator compartment 101B each have one or more independent storage chambers.

In some embodiments, the freezer compartment 101A may be operatively covered by a drawer door 200A. The refrigerator compartment 101B is partitioned into a left storage space and a right storage space. The refrigerator compartment 101B is selectively opened or closed by a door 200B pivotally mounted on the refrigerator compartment 101B.

Figure 2:
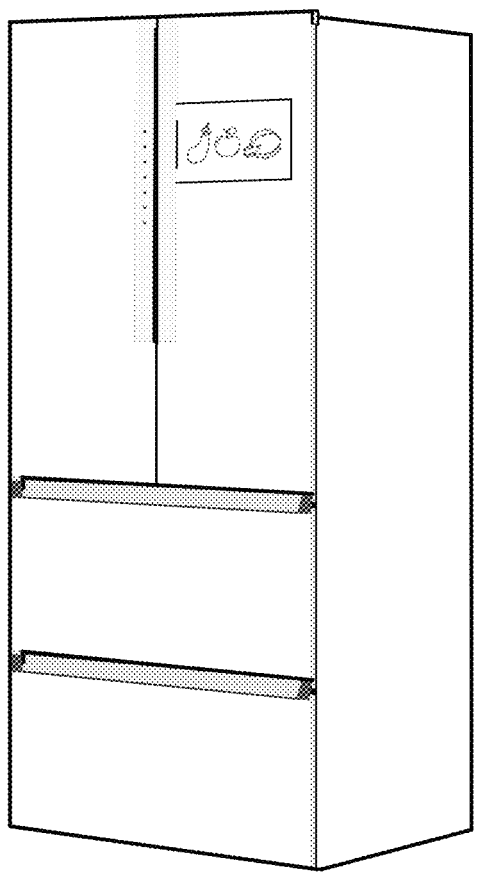
FIG. 2 shows a schematic diagram of an appearance of a refrigerator according to an exemplary embodiment of the present application.

FIG. 2 shows a schematic diagram of an appearance of a refrigerator according to an exemplary embodiment of the present application. As shown in FIG. 2, a display panel is arranged on a door 200B for the refrigerator compartment and embedded in the door body. In some embodiments, a surface of the display panel is aligned with an outer surface of the door.

In some embodiments, the refrigerator further includes a controller, the controller is connected with the display panel and is used to interact with a server to obtain information and data, draw a user interface, and output display information to the display panel, and the display panel receives a display signal output from the controller and displays corresponding image information, such as a user interface.

As shown in FIG. 1 and FIG. 2, the refrigerator according to an embodiment of the present application is provided with at least two storage compartments, such as a freezer compartment, a refrigerator compartment, a variable-temperature compartment and/or a fresh compartment. Each storage compartment may have a plurality of independent storage spaces, such as a drawer-type compartment.

In some embodiments, in order to intelligently manage food information, RFID tags are used to identify the foods in the storage compartments. Specifically, identity information of the RFID tag, such as the tag code written into the RFID tag, is pre-obtained, and a correspondence between the identity information of the RFID tag and a specific food is created to associate the RFID tag with that food. After attaching the RFID tag to the food, the food is placed in the refrigerator, and the refrigerator obtains the identity information of the RFID tag by detecting a signal of the RFID tag. When the identity information is obtained, food information corresponding to the RFID tag may be determined by means of the unique correspondence pre-established between the identity information of the RFID tag and the food information. By displaying the food information on the user interface presented on the display panel, a user may know the food in the refrigerator by checking the user interface, and may manage food by operating the user interface.

In some embodiments, an RFID detection module is arranged in each storage compartment, and the RFID detection module is used for transmitting wireless signals in the corresponding storage compartment and receiving signals from one or more RFID tags in the storage compartment to obtain the identity information of the one or more RFID tag.

In some embodiments, the RFID detection module may be implemented as an antenna. Antennas arranged in different storage compartments may have different power as long as the power of the antenna in each storage compartment may guarantee that the antenna can identify the food stored in the corresponding compartment. If the antenna is too large, the false identification rate may be increased, and if the antenna is too small, identifying foods in the corresponding compartment may fail. In specific implementations, the power of each antenna may be determined in advance according to a space size of each storage compartment, and the power of each antenna may be set in the refrigerator. The larger the space is, the higher the power is.

In some embodiments, the refrigerator may further include an RFID processing module, the RFID processing module is connected with each RFID detection module, and is used to control the RFID detection module to transmit wireless signals and receive the signal of the RFID tag returned from the RFID detection module.

In some embodiments, the controller is connected with the RFID detection module, and controls the RFID detection module to identify the signals of the RFID tags in the storage compartments, so as to obtain the identity information of each RFID tag and food information corresponding to each RFID tag. The food information includes identity information used for indicating the kind of the food, and by displaying the food information on the display panel, the user may know what foods are stored in the freezer compartment.

In some embodiments, the food information further includes a shelf life of the food. Freshness of the food may be monitored according to the shelf life of the food and a recorded placement time of the food by the user. The freshness of each food is identified on the food management interface to remind the user about whether the food reaches its expiration date, time duration until expiration date, expiration date and so on.

In related art, after placing the food in the storage compartment, the user needs to manually set a placement time of each food by operating a user interface presented on the display panel of the refrigerator, resulting in inconvenient operation steps and poor user experience.

In order to control the food information of the refrigerator more intelligently and improve user experience, the present application provides a refrigerator including a controller. The controller is configured to detect an opening/closing signal associated with a door, when it is detected that all doors are closed, instruct one or more RFID detection modules in connection with the controller to identify one or more RFID tags in all storage compartments to obtain identity information of each of the RFID tags in the refrigerator, and obtain a first set of information; by comparing the first set of information and a second set of information, determine a target tag placed in a first storage compartment; determine a target placement time of the target tag according to a current time; and update a placement time of a first food corresponding to the target tag by using the target placement time. In this way, there is no need to manually set the placement time of each food, which may provide better user experience and guarantee accuracy of the obtained time.

The second set of information is a set of information generated according to identity information of each RFID tag in the storage compartment obtained when all the doors are detected to be closed last time immediately before this time of all doors closing.

A zeroth set of information which is obtained when all the doors are detected to be closed last time and includes all identity information of all RFID tags is taken as an example, and the second set of information is generated according to the zeroth set of information. Specifically, identity information and removal information of an RFID tag corresponding to a food that is removed from the refrigerator last time are added to the zeroth set of information, to obtain the second set of information, and the removal information includes a removed state and a removal time of the RFID tag removed. It may be seen that the second set of information is different from the zeroth set of information in that the second set of information includes the identity information and the removal information of the RFID tag that was placed in the refrigerator and then has been removed from the refrigerator.

The first set of information obtained when all the doors are detected to be closed this time is taken as an example, and a third set of information may be generated according to the first set of information. Specifically, by comparing the first set of information with the second set of information, an RFID tag corresponding to a food removed from a storage compartment this time, that is, the RFID tag whose identity information merely exists in the second set of information, is determined, and the identity information and removal information of the RFID tag removed from a storage compartment this time are added to the first set of information, to generate a third set of information, where the removal information of an RFID tag removed from a storage compartment this time includes a marked removed state of the RFID tag and a removal time determined according to the current time.

In some embodiments, the refrigerator further includes a detector which is configured to detect an opening/closing signal of each door respectively, record the open/closed state of the door according to the detected opening/closing signal, and send open/closed state information to the controller.

In some embodiments, when detecting a signal for indicating opening of a door or a signal for indicating closing of a door, the detector sends latest open/closed state information to the controller. The controller receives the open/closed state information sent from the detector, and analyzes operation of the door according to the received open/closed state information. When the received open/closed state information shows that current open/closed states of all the doors are closed, all the doors are determined to be closed.

In the embodiments of the present application, the detector may specifically detect the opening/closing signal of the door by detecting a magnetic-sensing switch and a mechanical switch.

In some embodiments, the target tag includes a first target tag, and the first target tag refers to an RFID tag whose identity information merely exists in the first set of information. It may be understood that the user places a food identified by the first target tag in the storage compartment for the first time in this operation. A target placement time corresponding to the first target tag is determined as the current time.

In some scenarios, the user may take out a food identified by a certain RFID tag and place the food again in the refrigerator soon. In this case, if the placement time of this food is updated according to a time when the user places the food again in the refrigerator, a wrong placement time may be recorded.

In order to avoid a situation where a wrong placement time is recorded when the food placed in via this operation is the same food placed again in soon after the user takes the food out. In some other embodiments, the controller determines whether there is a second target tag by comparing the first set of information with the second set of information, and the second target tag refers to an RFID tag whose identity information exists in the first set of information and the second set of information and is marked with a removed state in the second set of information. It should be noted that the second set of information further includes a removal time corresponding to the second target tag.

When a target placement time corresponding to the second target tag is determined according to the current time, firstly, whether a time difference between the current time and the removal time corresponding to the second target tag is greater than the preset threshold is determined. If the time difference between the current time and the removal time corresponding to the second target tag is greater than the preset threshold, the target placement time corresponding to the second target tag is determined as the current time; otherwise, the target placement time corresponding to the second target tag is determined as last placement time. Exemplarily, the preset threshold may be set to 2 hours.

It may be seen from the above examples that if the user places a certain food again in the refrigerator within a preset time after taking the food out, the corresponding placement time of the food is not updated, such that the wrong placement time may be prevented from being recorded, and accuracy of automatically obtaining the placement time of the food by the refrigerator may be improved.

In some embodiments, the correspondence between the RFID tag and the food is pre-established, specifically the correspondence between the identity information of the RFID tag and the food information. The controller identifies the identity information of the RFID tag by the RFID detection module, and then searches for the food information corresponding to the RFID tag from the foregoing correspondence according to the identity information of the RFID tag.

In some embodiments, the user may update the correspondence between the RFID tag and the food by, for example, adding new corresponding information or changing food information corresponding to one certain RFID tag. In the case of changing the food information corresponding to one certain RFID tag, the same RFID tag may be used to identify different foods successively, thereby making the RFID tag more flexible.

In some embodiments, the correspondence between the RFID tag and the food is also called an association relation. The food information corresponding to the RFID tag is the food information associated with the RFID tag.

In some scenarios, after removing one certain RFID tag from the refrigerator, the user changes food information associated with the RFID tag. When the user places the changed RFID tag again in the refrigerator, since the food information corresponding to the RFID tag before and the food information corresponding to the RFID tag after are different, a wrong placement time may be recorded if the corresponding placement time of the RFID tag is not updated.

In order to avoid a situation where the wrong placement time is recorded due to change of the food information corresponding to the RFID tag. Firstly, when the food information corresponding to the RFID tag is modified, a marker of a re-association state is added to the identity information of the RFID tag to indicate that the food information currently corresponding to the RFID tag is different from the food information previously corresponding to the RFID tag. Secondly, when obtaining the first set of information, the controller obtains the identity information of each RFID tag in the storage compartment. When food information currently corresponding to the identity information is different from food information previously corresponding the identity information, the identity information carries a marker of a re-association state, and the marker of the re-association state is used to indicate that the food information currently associated with the RFID tag is different from the last associated food information, so as to obtain the first set of information. Further, the controller may determine whether the food information currently and last corresponding to each RFID tag are different by determining whether the identity information of each RFID tag is marked with the re-association state. Then, when the first set of information is compared with the second set of information to determine the target tag, all identity information in the first set of information is traversed to determine whether there is one marked with the re-association state, and the RFID tag whose identity information exists in the first set of information and the second set of information and is marked with the re-association state in the first set of information is determined as a third target tag. For the third target tag, the current time is determined as a target placement time of the third tag corresponding to the third target time.

It may be seen from the above examples that when the user places an RFID tag associated with new food information again in the refrigerator, the placement time of the food identified with the RFID tag may be updated according to the current time, such that the wrong placement time may be prevented from being recorded, and the accuracy of automatically obtaining the placement time of the food by the refrigerator may be improved.

In some embodiments, the food management interface is displayed/updated according to the target tag and the corresponding target placement time, such that the placement time of the food identified by the target tag on the food management interface is the target placement time corresponding to the target tag.

In some embodiments, on the food management interface, the foods in the refrigerator are presented in the form of food icons, images and texts, etc. In addition, functional controls may be drawn on the user interface, such as a control for identifying an RFID tag and a control for adding food.

In some embodiments, the user interface for managing food may include a plurality of food display areas and functional controls, one food display area may correspond to one food category or one storage compartment, and each food display area is used for displaying the food information corresponding to the RFID tag in the refrigerator. Food information of a corresponding category is displayed in the food display area corresponding to the food category, and food information in a corresponding storage compartment is displayed in the food display area corresponding to the storage compartment. The food information displayed on the interface includes, but is not limited to, an icon, a name, and a freshness indicator of the food. The icon of the food may be generated according to a representative image of the food, the freshness indicator of the food is generated according to the freshness of the food, and is used to show any one or more of placement time, remaining time duration until expiration date and expiration date (expired) of the food. The freshness of the food may specifically be the placement time, the remaining time duration until expiration date or the expiration dated (expired). The functional controls on the interface include, but are not limited to, controls for triggering RFID tag identification, controls for adding the food information, and controls for displaying recipe information, etc.

Figure 3:
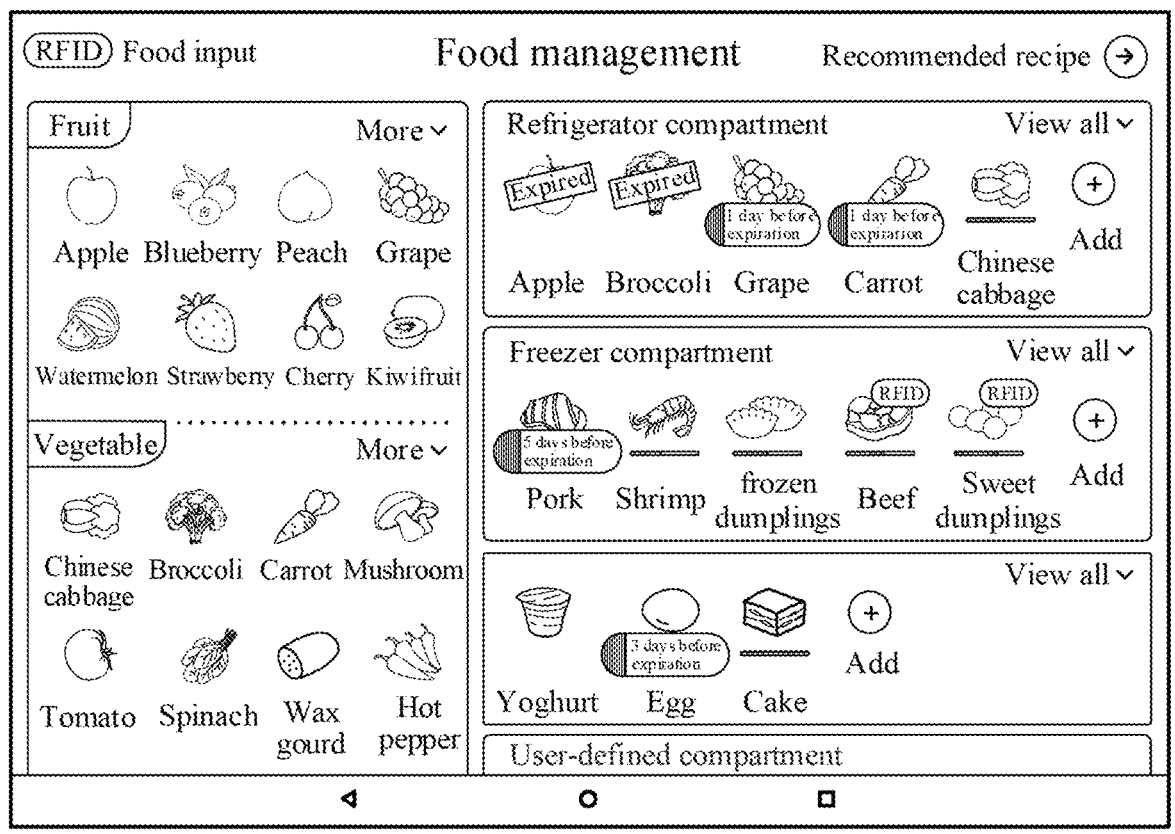
FIG. 3 shows a user interface according to an exemplary embodiment of the present application.

FIG. 3 shows a user interface according to an exemplary embodiment of the present application, which is specifically an exemplary interface for food management. With reference to FIG. 3, the interface for food management is divided into left and right display areas. The left area includes a control for RFID tag identification and food display areas corresponding to foods of many categories, such as fruits and vegetables, and each food display area displays the icon and the name of the food of a corresponding category, such as "apple" and a corresponding icon, "blueberry" and a corresponding icon in the food display areas corresponding to the fruits. The right area includes a control for recommended recipe and a food display area corresponding to each storage compartment, such as a refrigerator compartment, a variable-temperature compartment and a freezer compartment. Each food display area displays an icon and a name of a corresponding food, such as "apple" and a corresponding icon, "broccoli" and a corresponding icon in the food display area corresponding to the refrigerator compartment. On the interface shown in FIG. 3, each icon of the food has at least one bit, the at least one bit is used to load the freshness indicator of the food. The loaded freshness indicator is generated according to the freshness of the food, and the freshness of the food comprises at least one of the remaining time duration, the expiration date and the placement time of the food, and may be computed according to the placement time of the food and the shelf life of the food. For example, the freshness indicator of the "apple" in the food display area corresponding to the refrigerator compartment is "expired", and the freshness indicator of the "grape" is "1 day before expiration date".

In addition, in some embodiments, the refrigerator according to the present application also provides a function for tracing a last placement time of the food.

Specifically, after the food management interface shown in FIG. 3 is displayed, the controller controls to display a food list interface on an upper layer of the food management interface, and the food list interface displays the food information corresponding to the target tag. The user may input a first instruction by operating the food list interface, such as any food or specified position in a food list, or click a specified functional control according to the food list interface. The controller receives the first instruction input from the user, and displays a food editing interface for editing a specified food, and the latest placement time and/or the last placement time of the specified food is presented on the food editing interface. The user may input a second instruction by operating the food editing interface. The controller receives the second instruction input from the user on the food editing interface, and changes the placement time corresponding to the specified food to the last placement time.

Figure 4:
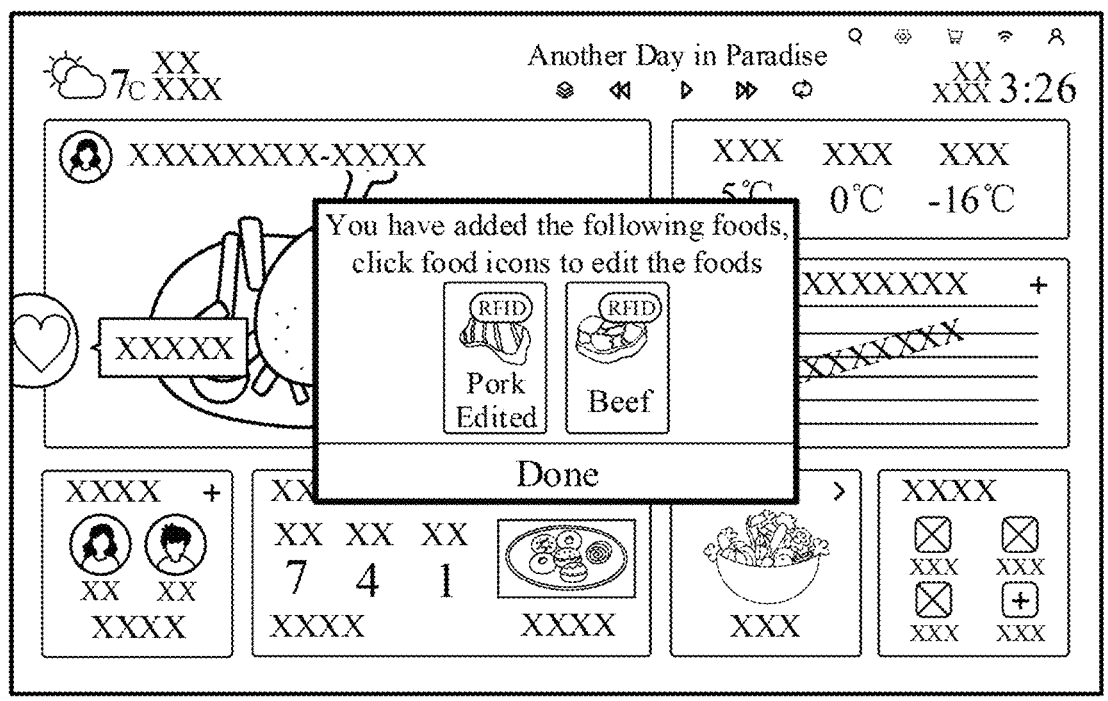
FIG. 4 shows another user interface according to an exemplary embodiment of the present application.

FIG. 4 shows a food list interface according to some exemplary embodiments of the present application. As shown in FIG. 4, the interface shows a newly added food in a refrigerator after current operation from a user, that is, the food corresponding to a target tag. The user may input a first instruction by clicking a food icon on the interface.

Figure 5:
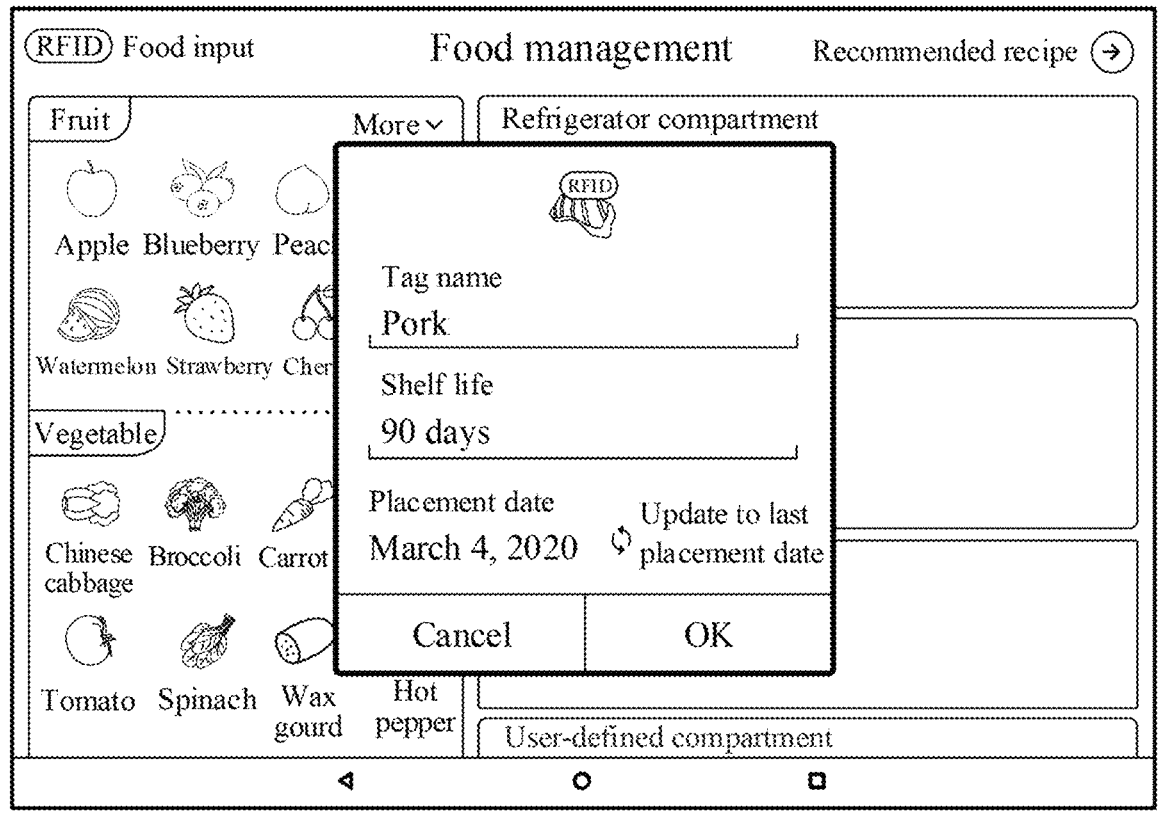
FIG. 5 shows another user interface according to an exemplary embodiment of the present application.

FIG. 5 shows a food editing interface according to some exemplary embodiments of the present application, which is specifically an interface after the food icon being clicked on the interface shown in FIG. 4. As shown in FIG. 5, the interface shows a name, a shelf life, a target placement time (placement time) determined by the above embodiment, and a functional control ("change to last placement time") used to trace the last placement time of the food, etc. The user may input a second instruction by clicking the "change to last placement time" control on the interface. The user may also input an instruction to finish editing by clicking an "OK" control on the interface, or click a "Cancel" control on the interface to input an instruction to cancel editing.

Figure 6:
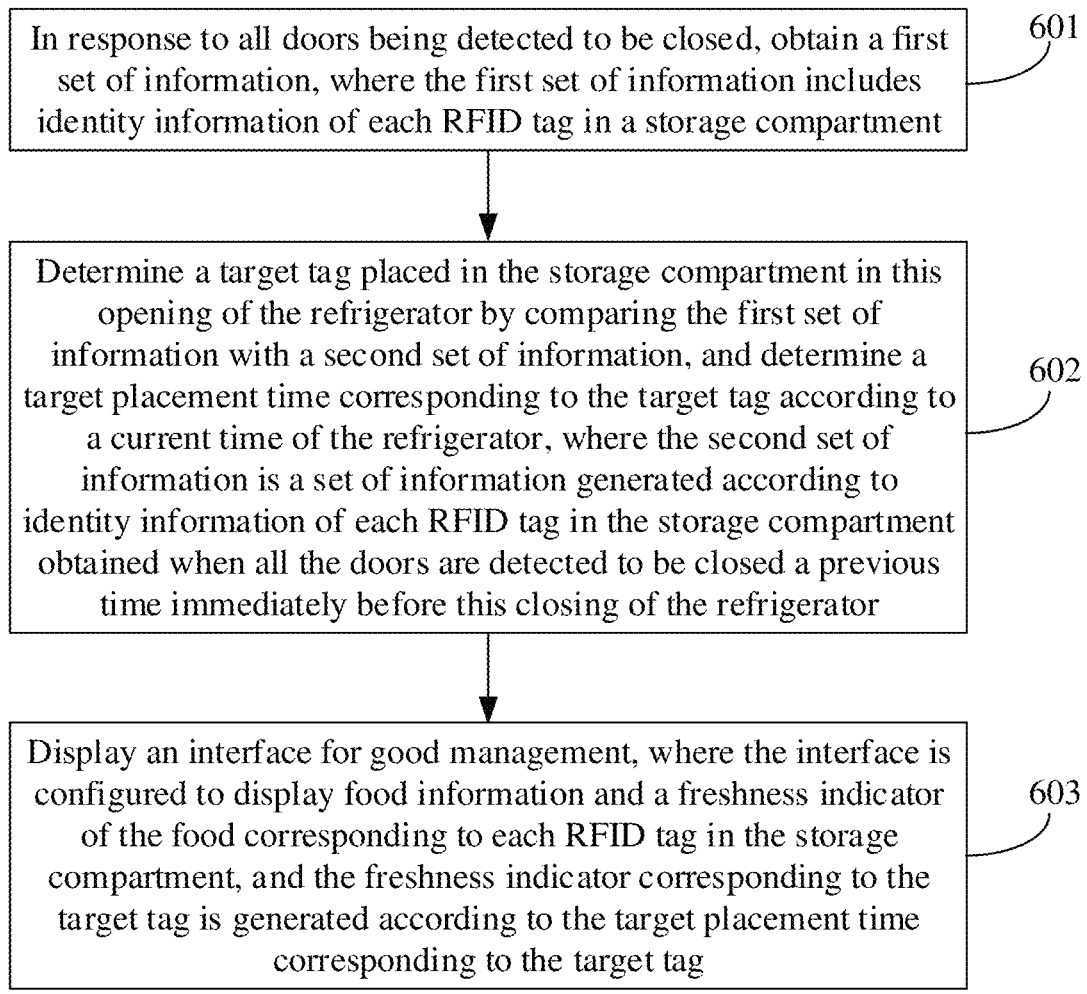
FIG. 6 shows a flowchart of a control method for the refrigerator according to an exemplary embodiment of the present application.

The present application further provides a control method for a refrigerator. FIG. 6 shows a flowchart of the method based on an exemplary embodiment of the present application. As shown in FIG. 6, the method includes the following.

Step 601: in response to all doors being detected to be closed, a first set of information is obtained, and the first set of information includes identity information of each RFID tag in a storage compartment.

The control method for a refrigerator according to the present application may be implemented in a controller of the refrigerator. The controller detects an opening/closing signal of a door by a detector in connection with the controller, and when all the doors are detected to be closed, it indicates that an RFID detection module connected with the controller starts to identify a signal of each RFID tag in the refrigerator to obtain identity information of the RFID tag, and obtained identity information of each RFID tag forms a first set of information.

Step 602: by comparing the first set of information with a second set of information, a target tag placed in the storage compartment in this opening of the refrigerator is determined, and a target placement time corresponding to the target tag is determined according to a current time of the refrigerator, where the second set of information is a set of information generated according to identity information of each RFID tag in the storage compartment obtained when all the doors are detected to be closed a previous time immediately before this closing of the refrigerator, that is, an immediate closing of the refrigerator prior to the present closing.

The target tag includes a first target tag, a second target tag and a third target tag. The first target tag refers to an RFID tag whose identity information merely exists in the first set of information. It may be understood that the first target tag is an RFID tag that is placed in the refrigerator for the first time by an operation during the present opening of the refrigerator. The second target tag refers to an RFID tag whose identity information exists in both the first set of information and the second set of information and is marked with a removed state in the second set of information. It may be understood that the second target tag is removed from the refrigerator before the present operation of the refrigerator and placed again in the refrigerator by means of the present opening of the refrigerator. The third target tag refers to an RFID tag whose identity information exists in the first set of information and the second set of information, and is marked with a re-association state in the first set of information. The re-association state indicates that food information currently associated with a XX RFID tag is different from the food information last associated with the XX RFID tag.

For the first target tag and the third target tag, the current time is determined as a target placement time corresponding to the first target tag and the third target tag. For the second target tag, when a time difference between a current time and a removal time corresponding to the second target tag is greater than a preset threshold, the current time is determined as a target placement time corresponding to the second target tag, and when the time difference between the current time and the removal time corresponding to the second target tag is not greater than the preset threshold, the last placement time corresponding to the second target tag is determined as the target placement time of the second target tag.

Step 603: an interface for good management is displayed, the interface is configured to display food information and a freshness indicator of the food corresponding to each RFID tag in the storage compartment, where the freshness indicator corresponding to the target tag is generated according to the target placement time corresponding to the target tag.

For example, on the interface shown in FIG. 3, each storage compartment corresponds to a food display area for displaying the food information and the freshness indicator of the food in the corresponding storage compartment, and the freshness indicator is used to show freshness of the food. The freshness of the food may be indicated by a placement time, remaining time duration until expiration date, expired or expiration date.

In step 603, the food management interface is displayed according to the target tag and the target placement time corresponding to the target tag. Specifically, firstly, the freshness of the food identified by the target tag is determined according to the target placement time corresponding to the target tag, for example, according to the target placement time and a shelf life of the food, the remaining time duration until expiration date of the food is determined, or whether the food is expired is determined, or the expiration date of the food is computed. Then, according to the freshness of the food, the freshness indicator of the food is generated, and food information and the freshness indicator of the food corresponding to the target tag are loaded and displayed on the food management interface.

It should be noted that one or more target tags may be configured, and the target placement time corresponding to each target tag determined according to the current time may be identical or not. For example, the target placement time corresponding to the first target tag and the third target tag are the current time, and the target placement time corresponding to the second target tag may be the last placement time.

In some embodiments, the controller is connected with the RFID detection module, and controls the RFID detection module to identify the signals of the RFID tags in the storage compartment, and obtain the identity information of each RFID tag and corresponding food information. Since the RFID detection module has a large detection range, it is impossible to accurately determine a storage location of each RFID tag. For example, an antenna in a freezer compartment may identify an RFID tag in another storage compartment, thus making intelligent management of the food in multiple compartments impossible, and affecting user experience.

In some embodiments, if a newly added RFID tag is detected in the refrigerator, food information corresponding to the newly added RFID tag is displayed on a specific user interface, and the user selects the food for operation and a corresponding storage compartment by operating the specific user interface, thereby achieving the intelligent management of the newly added food in multiple compartments.

In some embodiments, the controller is configured to draw a user interface according to the food information corresponding to each RFID tag in the storage compartments and display the user interface on a display panel, such as the food management interface. On the food management interface, the foods in the refrigerator are displayed in the form of food icons, images and texts, etc. In addition, functional controls may be drawn on the user interface, such as a control for RFID tag identification and a control for adding food.

In some embodiments, the food management interface may include a plurality of food display areas and functional controls, one food display area may correspond to one food category or one storage compartment, and each food display area is used for displaying the food information corresponding to the RFID tag in the refrigerator. Food information of a corresponding category is displayed in the food display area corresponding to the food category, and food information in a corresponding storage compartment is displayed in the food display area corresponding to the storage compartment. The food information displayed on the food management interface includes, but is not limited to, an icon, a name, and a freshness indicator of the food. The icon of the food may be generated according to a typical image of the food, and the freshness indicator of the food is used to show any one or more of placement time, remaining time duration until expiration date and expiration date of the food. The functional controls on the food management interface include, but are not limited to, controls for triggering RFID tag identification, controls for adding the food information, and controls for displaying recipe information, etc.

FIG. 3 shows a user interface according to an exemplary embodiment of the present application, which is specifically an exemplary food management interface. With reference to FIG. 3, the food management interface is divided into left and right display areas. The left area includes a control for RFID tag identification and food display areas corresponding to foods of many categories, such as fruits and vegetables, and each food display area displays the icon and the name of the food of a corresponding category. The right area includes a control for recommended recipe and a food display area corresponding to each storage compartment, such as a refrigerator compartment, a variable-temperature compartment and a freezer compartment. Each food display area displays an icon and a name of a corresponding food. In addition, the right area of the food management interface shown in FIG. 3 further includes a user-defined area, and the user-defined area is used to display newly added foods, having not been divided or classified by the user, in the refrigerator. On the food management interface shown in FIG. 3, all foods identified with the RFID tags in the refrigerator are completely displayed.

When the food management interface shown in FIG. 3 is displayed on the display panel, the user may click the user-defined area to trigger an operation process of dividing and classifying the newly added food in the user-defined area.

Figure 7:
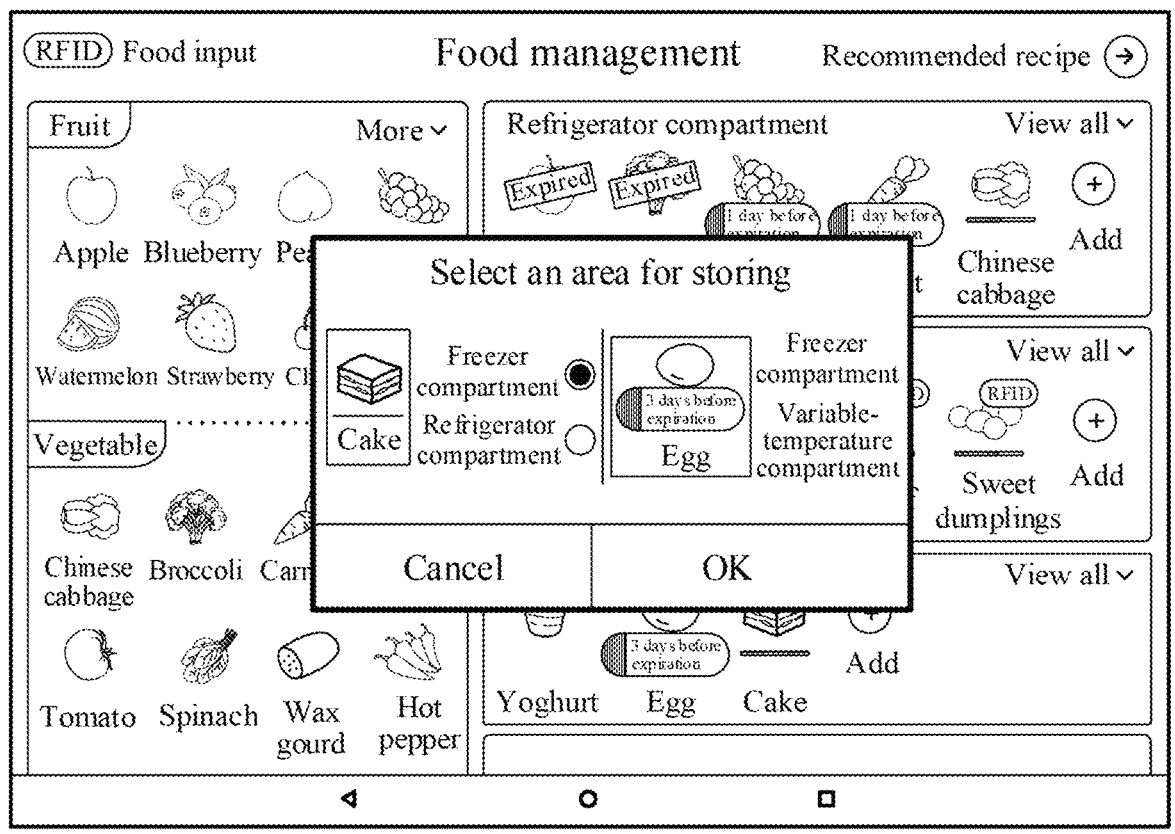
FIG. 7 shows another user interface according to an exemplary embodiment of the present application.

Exemplarily, in response to a click on the user-defined area from the user, a virtual storage interface as shown in FIG. 7 is displayed. On the virtual storage interface, food information to be classified and stored, storage compartment options to which food may be assigned, and related functional controls such as "OK" and "Cancel" are displayed. By operating a control on the virtual storage interface, the food in the user-defined area may be classified and stored accordingly.

It may be seen that although the above embodiments may realize food assignment and classification and management of the food, there is a need to operate on each newly added food in the refrigerator one by one, such that an intelligent management degree of the food in the refrigerator is low, and the user experience is poor.

In order to further improve the intelligent degree of the refrigerator and the user experience, the open/closed state (including an open state and a closed state) of the door are obtained by detecting the opening/closing signal (including an opening signal and a closing signal) of the door, and then the target operation door, that is, the door operated by the user is determined according to change of the open/closed state associated with that door, and the target storage compartment is determined according to the target operation door. Finally, the newly added food in the storage compartment after this operation is classified into the target storage compartment. Therefore, it may be seen that the classification process does not involve user's manual operation, and the food is completely intelligently managed.

In some embodiments, the refrigerator further includes a detector which is configured to detect an opening/closing signal of each door respectively, record the open/closed state of the door according to the detected opening/closing signal, and send open/closed state information to the controller, where the open/closed state information includes previous two open/closed states of each door.

Exemplarily, a changing process of the open/closed state of the door is recorded by recording a previous state (Oldstate) and a latter state (Newstate) of the door. For example, when the opening signal of the door is detected, the latter state of the door is recorded as the open state (Newstate=open), and the state (closed state) recorded before this opening signal is detected is automatically updated to the previous state. Then, when the closing signal of the door is detected, the latter state of the door is updated as closed state (Newstate=closed), and the state (open state) before this closing signal is detected is automatically updated as the previous state.

In some embodiments, when detecting an opening signal or a closing signal of any door, the detector sends open/closed state information to the controller, and the open/closed state information includes previous two open/closed states, namely the previous state and the latter state, of each door.

Exemplarily, contents of fields in the open/closed state information sent from the detector to the controller are as follows.

| Index | Oldstate | Newstate |
|---|---|---|
| Int type | Int type | Int type |
| 1: Door of refrigerator compartment | 0: closed | 0: closed |
| 2: Door of freezer compartment | 1: open | 0: closed |

-continued

| Index | Oldstate | Newstate |
|---|---|---|
| 3: Door of variable-temperature compartment | 0: closed | 1: open |
| ... | ... | ... |

In some embodiments, the controller receives the open/closed state information sent from the detector, and analyzes operation of the door according to the open/closed state information received. For convenience of description, the present application refers to the door operated by a user as a target operation door, and the target operation door refers to the door whose open/closed state changes. Specifically, if the previous state of the door is an open state and the latter state is a closed state, it means that the user has performed complete opening and closing operation on the door, and the door is determined as the target operation door.

For example, according to the contents included in the above exemplary open/closed state information, it may be determined that the door of the refrigerator compartment is not operated, the door of the variable-temperature compartment is opened but not closed, and the door of the freezer compartment is opened and then closed, so the target operation doors are determined to be the door of the freezer compartment and the door of the variable-temperature compartment.

In the embodiments of the present application, the detector may specifically detect the opening/closing signal of the door by detecting a magnetic-sensing switch and a mechanical switch.

In some embodiments, the controller determines a target storage compartment according to the target operation door. Specifically, when one target operation door is provided, a storage compartment corresponding to the target operation door is determined as the target storage compartment, and when more than one target operation door is provided, a preset virtual storage compartment is determined as the target storage compartment, such as a user-defined area in the embodiment shown in FIG. 3.

Exemplarily, if the target operation door is determined as the door of the refrigerator compartment according to door state information, then the target storage compartment is the refrigerator compartment. If the target operation doors are determined to include the door of the refrigerator compartment and the door of the freezer compartment according to the door state information, then the target storage compartment is the virtual storage compartment.

In some embodiments, the detector sends the open/closed state information to the controller once, every time the detector detects the opening signal of one door, and sends open/closed state information of a door which is closed finally to the controller until the detector detects a closing signal of the door closed in the end. According to the received open/closed state information, the controller determines whether all the doors are closed, that is, whether latter states of all the doors are closed states, and instructs, after all the doors are closed, the RFID detection module connected with the controller to identify all RFID tags in all the storage compartments, so as to obtain the identity information of an RFID tag corresponding to each food in the storage compartment to obtain the first set of information.

After obtaining the first set of information by the RFID detection module, the controller may compare the first set of information with the second set of information to determine a food placed in the refrigerator and/or taken out of the refrigerator in the present operation, and the second set of information is a set of information generated according to the identity information of each RFID tag in the storage compartment obtained in response to all the doors being detected to be closed a previous time immediate prior to the present operation.

A zeroth set of information which is obtained when all the doors are detected to be closed a previous time and includes all identity information of all RFID tags is taken as an example, and the second set of information is generated according to the zeroth set of information. Specifically, the identity information of the RFID tag corresponding to the food removed from the refrigerator last time is added to the zeroth set of information, and marked with the removed state to obtain the second set of information. It may be seen that the second set of information is different from the zeroth set of information in that the second set of information includes the identity information of the RFID tag that was placed in the refrigerator and then removed from the refrigerator.

The first set of information obtained when all the doors are detected to be closed this time is taken as an example, and a third set of information may be generated according to the first set of information. Specifically, by comparing the first set of information with the second set of information, an RFID tag corresponding to a food removed from the storage compartment this time, that is, the RFID tag whose identity information merely exists in the second set of information, is determined, and the identity information of the RFID tag removed from the storage compartment this time is added to the first set of information, and is marked with a removed state to generate the third set of information.

In some embodiments, by comparing the first set of information with the second set of information, the controller determines a tag corresponding to a food placed in the refrigerator this time, that is, the target tag, and displays a food management interface according to the target tag and a target storage compartment associated with the target tag, and on the food management interface, a storage location of the food identified by the target tag is the target storage compartment. The target storage compartment is the storage compartment corresponding to the target operation door or the preset virtual storage compartment. When the food management interface is displayed according to the target tag and the target storage compartment, food information corresponding to the target tag is loaded in a food display area corresponding to a refrigerator compartment, the food information (such as cucumber) associated with the target tag is displayed in the food display area corresponding to the refrigerator compartment, and when the target storage compartment is the virtual storage compartment, the food information associated with the target tag is displayed in the food display area corresponding to the virtual storage compartment, such as the user-defined area shown in FIG. 3.

In some embodiments, the target tag may be a first target tag, the first target tag refers to an RFID tag whose identity information exists in the first set of information and the second set of information and is marked with a removed state in the second set of information. The user places the food corresponding to the first target tag again in the storage compartment by the present operation.

In some embodiments, the above target tag may also be a second target tag, the second target tag refers to an RFID tag whose identity information exists in the first set of information but not in the second set of information. The user places a food corresponding to the second target tag into the storage compartment for the first time by the present operation.

In some embodiments, the user may classify the food to be stored in the virtual storage compartment with one button by operating that button on the food management interface, so as to avoid operation on each food one by one.

When the food management interface is displayed on the display panel, the user may input a first instruction by operating the food management interface, such as clicking any position or specific position in the food display area corresponding to the virtual storage compartments, or clicking a specified functional control provided on the food management interface. The controller receives the first instruction input from the user, and displays a virtual storage interface on an upper layer of the food management interface, a food with a storage position in the virtual storage compartment and a recommended storage compartment corresponding to the food are displayed on the virtual storage interface, and the recommended storage compartment corresponding to each food is determined according to a preset correspondence between the food and the storage compartment.

Figure 8:
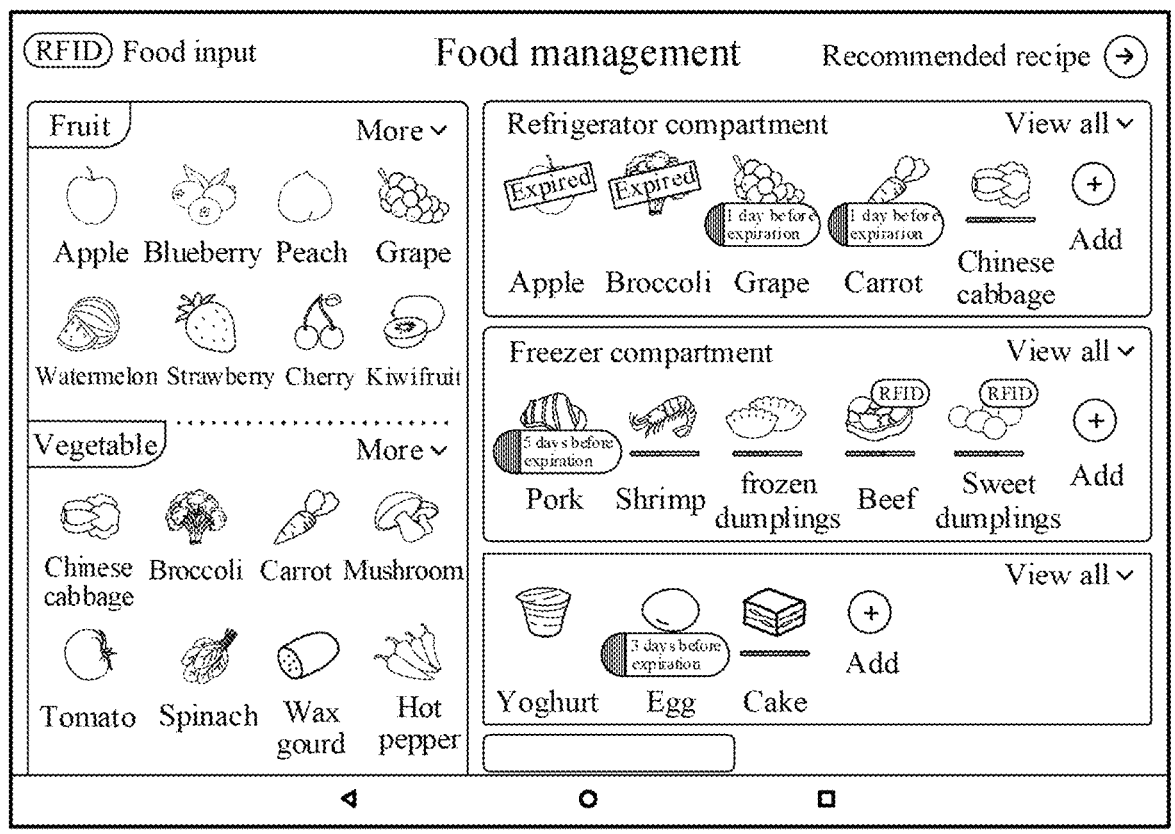
FIG. 8 shows another user interface according to an exemplary embodiment of the present application.

FIG. 8 shows a user interface according to an exemplary embodiment of the present application, which is specifically an exemplary virtual storage interface. As shown in FIG. 8, on the virtual storage interface, a food of a virtual storage compartment and a recommended storage compartment corresponding to the food are displayed.

In some embodiments, a preset correspondence table between the food and the storage compartment is pre-obtained, and according to the preset correspondence table, a corresponding recommended storage compartment may be determined according to food information in the virtual storage compartment. For example, the virtual storage compartment has cucumber inside, and according to the preset correspondence table, the recommended storage compartment for the cucumber is a refrigerator compartment, so the recommended storage compartment for the cucumber is displayed as a refrigerator compartment on the virtual storage interface.

When the virtual storage interface is displayed on a display panel, a user may input a second instruction by operating the virtual storage interface, for example, clicking a functional control (an "OK" control shown in FIG. 8) displayed on the virtual storage interface. A controller receives the second instruction input from the user, and changes a storage position of the food in the virtual storage compartment from the virtual storage compartment to the recommended storage compartment for the food, thereby achieving one-click assignment for storage of the food in the virtual storage compartment. After the one-click assignment of food storage, the food in the virtual storage compartment may be presented in a display area corresponding to the recommended storage compartment.

In some other embodiments, in addition to the recommended storage compartment for the food, other storage compartments options may be presented on the virtual storage interface for the user to choose, so as to achieve personalized storage of the food.

It may be seen from the above embodiments that one or more opening/closing signals corresponding to one or more doors are detected to determine whether the one or more door have been operated. When the one or more states of the one or more door changes, for example, from open state to close state or from close state to open state, a target operation door whose states change is determined according to the one or more states of the one or more doors. After all doors are closed, a target storage compartment is determined according to the target operation door. Finally, the newly added food in the storage compartment is classified into the target storage compartment, so as to automatically identify the storage position of the food, and the assignment of the food storage space does not need manual operation of the user, so as to improve user experience.

Figure 9:
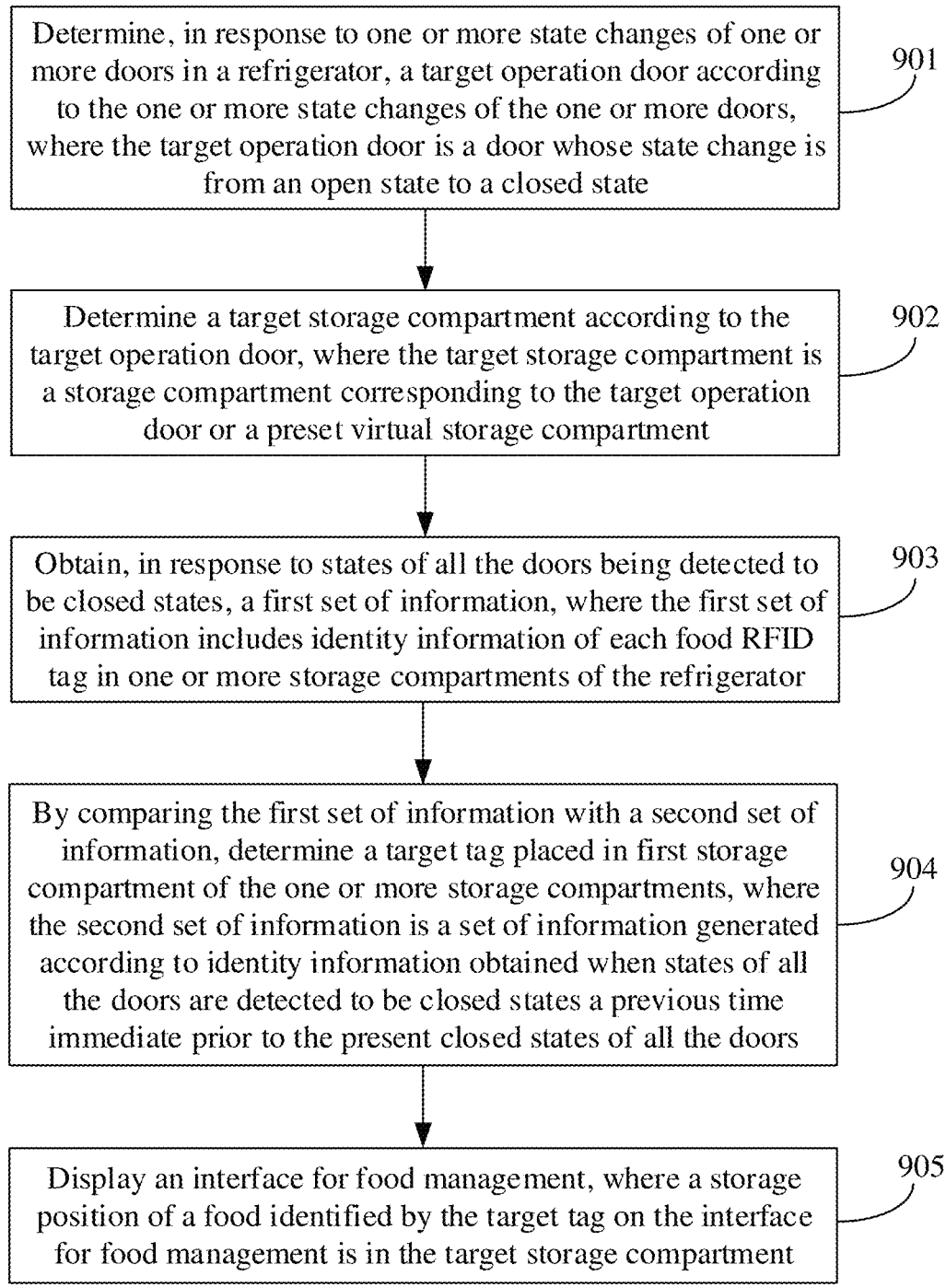
FIG. 9 shows a flowchart of a control method for a refrigerator according to an exemplary embodiment of the present application.

The embodiments of the present application provide a control method for a refrigerator, and FIG. 9 shows a flowchart of the control method for the refrigerator according to an exemplary embodiment of the present application. As shown in FIG. 9, the method includes the following.

Step 901: in response to one or more state changes of one or more doors in a refrigerator, a target operation door is determined according to the one or more state changes of the one or more doors, where the target operation door is a door whose state change is from an open state to a closed state.

When an opening signal or a closing signal of a door is detected, latest open/closed state of this door, that is an open state or close state indicated by the present opening signal or closing signal of the door, are recorded, and then determine whether a state of a door has changed. According to a changing process of the states of the one or more doors, the target operation door that is operated (opened and/or closed) by a user may be determined. The target operation door refers to a door whose open/closed state changes, for example, a door that changes from an open state to a closed state or a door that changes from the closed state to the open state.

Step 902: a target storage compartment is determined according to the target operation door, where the target storage compartment is a storage compartment corresponding to the target operation door or a preset virtual storage compartment.

When one target operation door is determined, the storage compartment corresponding to the target operation door is determined as the target storage compartment, and when more than one target operation door is determined, the preset virtual storage compartment is determined as the target storage compartment. The target storage compartment is a storage location of the food placed in the refrigerator by the user when operating the door this time.

Step 903: in response to states of all the doors being detected to be closed states, a first set of information is obtained, and the first set of information includes identity information of each food RFID tag in one or more storage compartments of the refrigerator.

An RFID detection module identifies a signal of each RFID tag in the refrigerator to obtain the identity information of each RFID tag, and the obtained identity information of each RFID tag forms the first set of information.

Step 904: by comparing the first set of information with a second set of information, a target tag placed in first storage compartment of the one or more storage compartments is determined, where the second set of information is a set of information generated according to identity information obtained when states of all the doors are detected to be closed states a previous time immediate prior to the present closed states of all the doors.

The target tag includes a first target tag and a second target tag. The first target tag refers to an RFID tag whose identity information exists in the first set of information and the second set of information and is marked with a removed state in the second set of information. It means that the second target tag is removed from the refrigerator before this operation and placed again in the refrigerator by this operation. The second target tag refers to an RFID tag whose identity information merely exists in the first set of information. It means that the second target tag is the RFID tag placed in the refrigerator for the first time by means of this operation.

Step 905: an interface for food management is displayed, where a storage position of a food identified by the target tag on the interface for food management is in the target storage compartment.

FIG. 3 shows a food management interface. As shown in FIG. 3, on the food management interface, each storage compartment corresponds to a food display area which is used to display food information in a corresponding storage compartment.

In step 905, the food management interface is displayed according to the target tag and the target storage compartment, specifically, the food information corresponding to the target tag is loaded and displayed in the food display area for the target storage compartment.

For example, food information corresponding to one or more target tags is presented in the food display area for the target storage compartment, and the target storage compartment may be one of a refrigerator compartment, a freezer compartment, etc., or the virtual storage compartment.

With reference to FIG. 3, the food management interface is divided into left and right display areas. The left area includes a control for RFID tag identification and food display areas corresponding to foods of many categories, such as fruits and vegetables, and each food display area displays an icon and a name of the food of a category. The right area includes a control for recommended recipe and a food display area corresponding to each storage compartment, such as a refrigerator compartment, a variable-temperature compartment and a freezer compartment. Each food display area displays an icon and a name of a food.

In the above embodiments, an RFID tag is associated with a food by converting a category of the food and/or a name of the food into a food code and writing the food code into the RFID tag. For example, the RFID tag is placed in a specific area of a read-write device, the category and/or the name of food input from the user is received on a corresponding operation interface, and the category and/or the name of the food is converted into the food code and written into the RFID tag. Such association manner is not only cumbersome to operate, but also the food code may not be updated once written, resulting in poor flexibility of the RFID tag, and wrong operation, if there is a wrong operation, the operation may not be recovered.

In view of the above issues, in some embodiments, virtual association between the RFID tag and the food information is implemented by establishing a correspondence between the RFID tag and the food information, operation of writing the food information for each RFID tag is unnecessary, and the correspondence between the RFID tag and the food information may be modified to make the same RFID tag correspond to different pieces of food information successively, thus improving use flexibility of the RFID tag.

It should be noted that there are many ways to establish the correspondence between the RFID tag and the food information, and several specific implementation ways will be described below.

In some embodiments, a correspondence between the identity information of the RFID tag and the food information is pre-established to achieve the virtual association between the RFID tag and the food. The identity information of the RFID tag may be a tag code of the RFID tag identified by the detection module, or one code segment in a tag code of the RFID tag identified by the detection module. In these embodiments, a controller of the refrigerator determines the food information corresponding to each RFID tag according to the identity information of each RFID tag and the pre-established correspondence.

Exemplarily, the pre-established correspondence between the identity information of the RFID tag and the food information may be shown in the following table 1.

TABLE 1

| RFID | Food information |
| --- | --- |
| Identifier 1 | Apple, fruit |
| Identifier 2 | Cucumber, vegetable |
| Identifier 3 | Pork, meat |
| ... | ... |

In the above embodiments, the virtual association between the RFID tag and the food information is achieved by establishing the correspondence between the identity information of the RFID tag and a piece of food information, the operation of writing the piece of food information for each RFID tag is unnecessary, and it merely needs to store correspondingly the identity information of the RFID tag and the specific food information in a database after obtaining the identity information of the RFID tag. In addition, the same RFID tag may be successively associated with different pieces of food by changing the correspondence, which solves the problem that the food information may not be changed once written, and improves the flexibility of the RFID tag.

In some embodiments, a correspondence table between the identity information of the RFID tag and the food information is established on a server side and issued. On a refrigerator side, a controller of a refrigerator obtains the correspondence table from the server and stores same locally; When the food identified by the RFID tag in the refrigerator need to be displayed on the user interface of the refrigerator, the controller instructs the RFID detection module of the refrigerator to detect the information of the RFID tag in the refrigerator to obtain the tag code of the RFID tag, analyzes the identity information of the RFID tag from the tag code, then determines the food information corresponding to the identity information of the RFID tag according to the locally stored correspondence table, and finally displays food information on the user interface according to the food information corresponding to the RFID tag.

In some embodiments, the correspondence table between the identity information of RFID tag and food information is established on the refrigerator side and stored locally. Specifically, when the food management interface is displayed on a display panel, a user may input an instruction to input the food information by operating the food management interface, for example, the user clicks a control for food information input provided by the food management interface. After receiving an instruction for inputting food information, the controller starts to detect a signal of an RFID tag placed in a specified area to obtain identity information of the RFID tag, and displays an association interface for associating the RFID tag with the food information. The association interface displays the obtained identity information of the RFID tag, and the association interface is configured to receive food information input from the user, and may include an input area for inputting the food information. When receiving the food information input from the user on the association interface, the controller associates the received food information and the identity information and stores correspondingly, thus completing establishment of the correspondence table between the identity information of the RFID tag and the food information.

Figure 10:
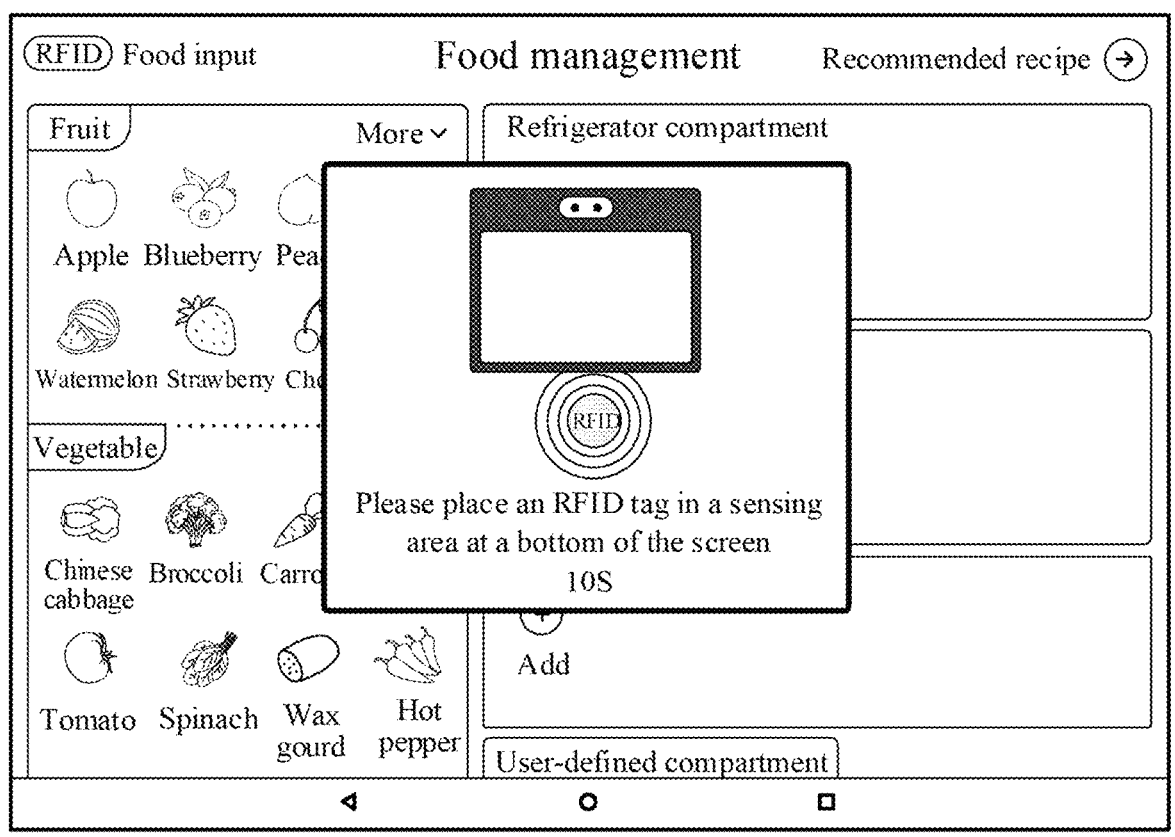
FIG. 10 shows another user interface according to an exemplary embodiment of the present application.

As shown in FIG. 3, the user may click the control for RFID tag identification on the interface to input an instruction for inputting the food information. When receiving the instruction from the user, in response to the instruction, the controller displays a prompt (as shown in FIG. 10) for prompting the user to place the RFID tag in a sensing area on an upper layer of the food management interface as shown in FIG. 3, and starts to detect a signal of the RFID tag placed in the sensing area to obtain identity information of the RFID tag. After obtaining the identity information of the RFID tag, the controller presents an association interface including the identity information on the display panel.

Figure 11:
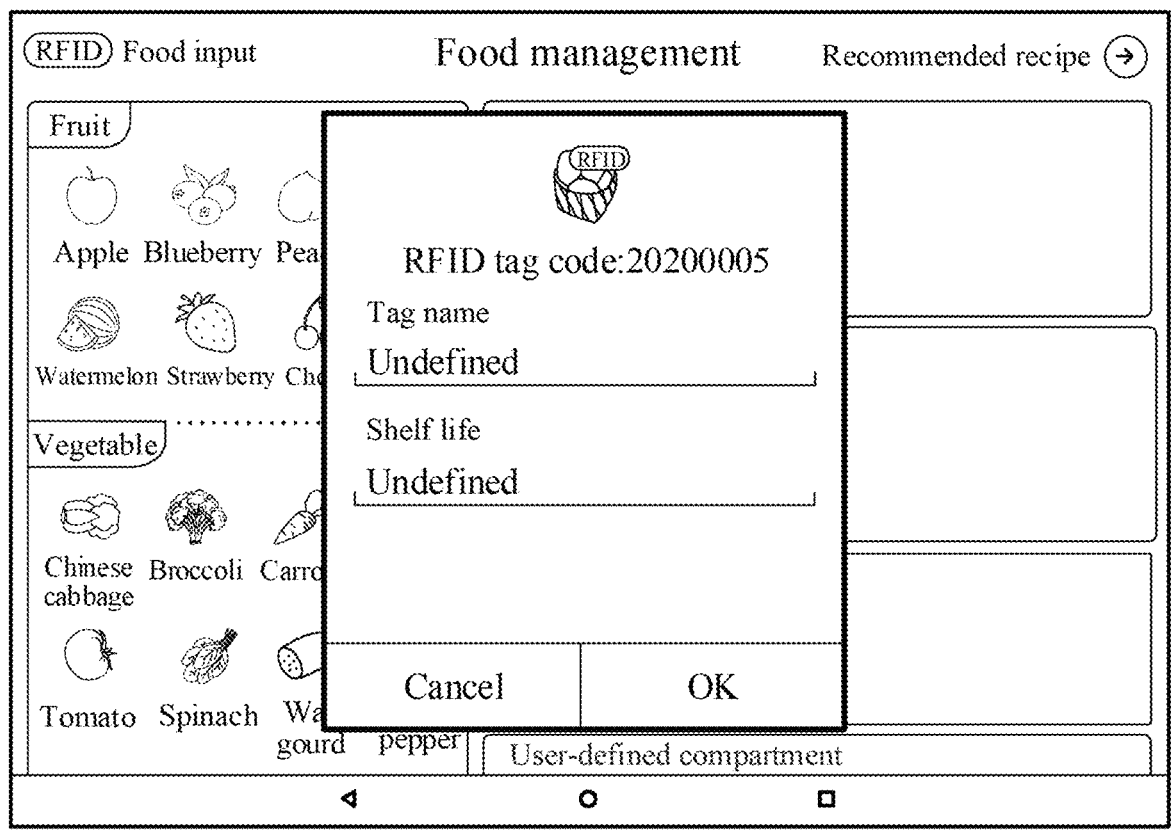
FIG. 11 shows another user interface according to an exemplary embodiment of the present application.

FIG. 11 shows an association interface according to an exemplary embodiment of the present application. As shown in FIG. 11, the association interface displays identity information "20200005" of an RFID tag, an input position for inputting a name of a food, an input position for inputting a category of the food, and a "Cancel" control and an "OK" control.

In the above embodiments, the identity information of the RFID tag is identified by an RFID module and displayed on the association interface, and a user does not need to manually input the identity information, thus avoiding input errors and saving operations by the user. Virtual association between the RFID tag and the food information is achieved by establishing a correspondence between the RFID tag and the food information, operation of writing the food information for each RFID tag is unnecessary, and the correspondence between the RFID tag and the food information may be modified to make the same RFID tag correspond to different food information successively, thus improving use flexibility of the RFID tag.

In some other embodiments, a tag code of the RFID tag includes at least two code segments, namely a first code segment and a second code segment. The first code segment is used for writing a first code portion, the first code portion may be a predetermined code or a non-predetermined code. For an RFID tag whose first code portion is a predetermined code, food information corresponding to the RFID tag may be customized by the user. For an RFID tag whose first code portion is a non-predetermined code, preset food information corresponding to the RFID tag is pre-saved in a cloud server, and may not be customized by the user. The second code segment is used for writing a second code portion, and the second code portion is unique identity information of the RFID tag.

In some embodiments, the at least two code segments included in the tag code of the RFID tag conform to a preset composition rule, and after obtaining the tag code, a controller intercepts the first code segment and/or the second code segment according to the preset composition rule to obtain the first code portion and/or the second code portion, thereby saving a process of parsing long code information and improving processing efficiency.

In some embodiments, the predetermined code is unique, such as 00. More than one non-predetermined code may exist and are not unique, and one non-predetermined code corresponds to one kind of food information.

Exemplarily, an RFID tag has a tag coding structure shown in table 2.

TABLE 2

| Code segment | First code segment | Second code segment |
| --- | --- | --- |
| Content | First code portion (predetermined code or non-predetermined code) | Second code portion (identity information) |
| Length | 2-bit hexadecimal | 24-bit hexadecimal |

For example, if the RFID tag code obtained by the controller is "011234567890123456789 01234", the first code portion may be "01" and the second code portion may be "123456789012345678901234" according to the preset composition rule.

It should be noted that, according to different requirements, the tag code of the RFID tag may further include more code segments, such as a third code segment for writing manufacturer identity of the RFID tag, and a fourth code segment used as reserved bits of the tag code, so as to improve extensibility of the RFID tag. In some other embodiments, the manufacturer identification of the RFID tag may also be included in the second code segment, which may not be repeated herein.

Exemplarily, a correspondence between the first code portion (non-predetermined code) and the food information may be shown in the following table 3.

TABLE 3

| RFID first code portion | Food name | Food category |
| --- | --- | --- |
| 01 | Radish | Vegetable |
| 02 | Carrot | Vegetable |
| 03 | Lotus root | Vegetable |
| . . . | . . . | . . . |

In some embodiments, the controller is configured to, in response to an instruction for identifying an RFID tag from a user, obtain a tag code of the RFID tag; then determine whether a first code portion of the tag code is a predetermined code; in response the first code portion being the predetermined code, display a first association interface configured for receiving target food information which is customized by the user for the RFID tag; and after receiving the target food information input from the user on the first association interface, associate the target food information with the RFID tag.

In some embodiments, associating the target food information with the RFID tag means that the second code portion of the RFID tag (i.e., the identity information of the tag) and the target food information are relatedly stored in local memory, and food information corresponding to a tag is retrieved according to a correspondence between the food information and the second code portion of the RFID tag when the second code portion of the tag is known.

In some embodiments, associating the target food information with the RFID tag further includes: a food ID is generated according to a current time, and the second code portion of the RFID tag and the food ID are stored in the local memory together with the target food information relatedly, and the current time includes, but is not limited to, a time when a controller receives the target food information.

In some embodiments, the user may input an instruction to identify the tag by operating the food management interface, for example, the user clicks the control for RFID tag identification on the food management interface shown in FIG. 3 to input the user instruction. When the controller receives the instruction to identify the RFID tag, a TOEST prompt (as shown in FIG. 10) is displayed on the food management interface to prompt the user to place the RFID tag in a sensing area, and an RFID detection module in the sensing area is instructed to start identifying the RFID tag to obtain the tag code of the RFID tag. In some embodiments, the first association interface includes one or more input positions for inputting one or more items of the target food information, and when a click at the input position from the user is detected, the input position is activated to receive text information, i.e., the target food information, input by the user. According to different elements and layouts on the first association interface, the target food information input by the user on the first association interface includes, but is not limited to, the name of the food, a shelf life of the food, etc.

FIG. 11 shows a user interface according to an exemplary embodiment of the present application, which is specifically an exemplary first association interface. As shown in FIG. 11, the first association interface includes an input position for inputting a name of a food and an input position for inputting a shelf life of the food.

Accordingly, if a first code portion is not a predetermined code, preset food information of an RFID tag is obtained according to the first code portion, and the preset food information is associated with the RFID tag. In some embodiments, associating the preset food information with the RFID tag means that the preset food information and a second code portion of the RFID tag are correspondingly stored locally. In some embodiments, associating the preset food information with the RFID tag further includes: a food ID is generated according to a current time, the food ID, the second code portion of the RFID tag and preset food information are stored in the local data relatedly, and the current time includes, but is not limited to, a time when a controller obtains the preset food information.

During specific implementations, the controller may obtain corresponding preset food information from a cloud server according to the first code portion. Alternatively, the controller may obtain corresponding preset food information from a local preset correspondence table between the first code portion and the food information according to the first code portion. The local preset correspondence table may be pre-downloaded by the controller from the cloud server.

In the above embodiments, whether the food information corresponding to the RFID tag may be customized by the user is determined according to whether the first code portion is a predetermined code. If the first code portion is a predetermined code, it means that the food information corresponding to the RFID tag may be customized by the user. Therefore, the first association interface where the target food information may be input is displayed, and the received target food information corresponds to the RFID tag, thus improving use flexibility of the RFID tag. If the first code portion is a non-predetermined code, it means that the food information corresponding to the RFID tag may not be customized by the user, then the corresponding preset food information is obtained according to the first code portion, and the preset food information corresponds to the RFID tag, thus saving operations of the user and improving input efficiency of the food information.

In some embodiments, when the first association interface is displayed, whether food information corresponding to the second code portion is in the local memory is determined according to the second code portion (i.e., identity information of the RFID tag), and if the food information corresponding to the second code portion is in the local memory, the food information corresponding to the second code portion is used to pre-fill a corresponding input position on the first association interface. In this way, on the one hand, food information currently associated with the RFID tag may be displayed to the user. On the other hand, if the user wants to change the currently associated food information, the user may input new food information in each input position. In addition, if the user merely wants to change part of the food information, the part of the food information is re-put, and there is no need to re-put the other part of the food information that the user does not want to change. If the food information associated with the RFID tag does not exist in the local association memory, the corresponding input position on the first association interface is pre-filled with preset characters, such as "undefined" shown at the input position in FIG. 11.

Figure 12:
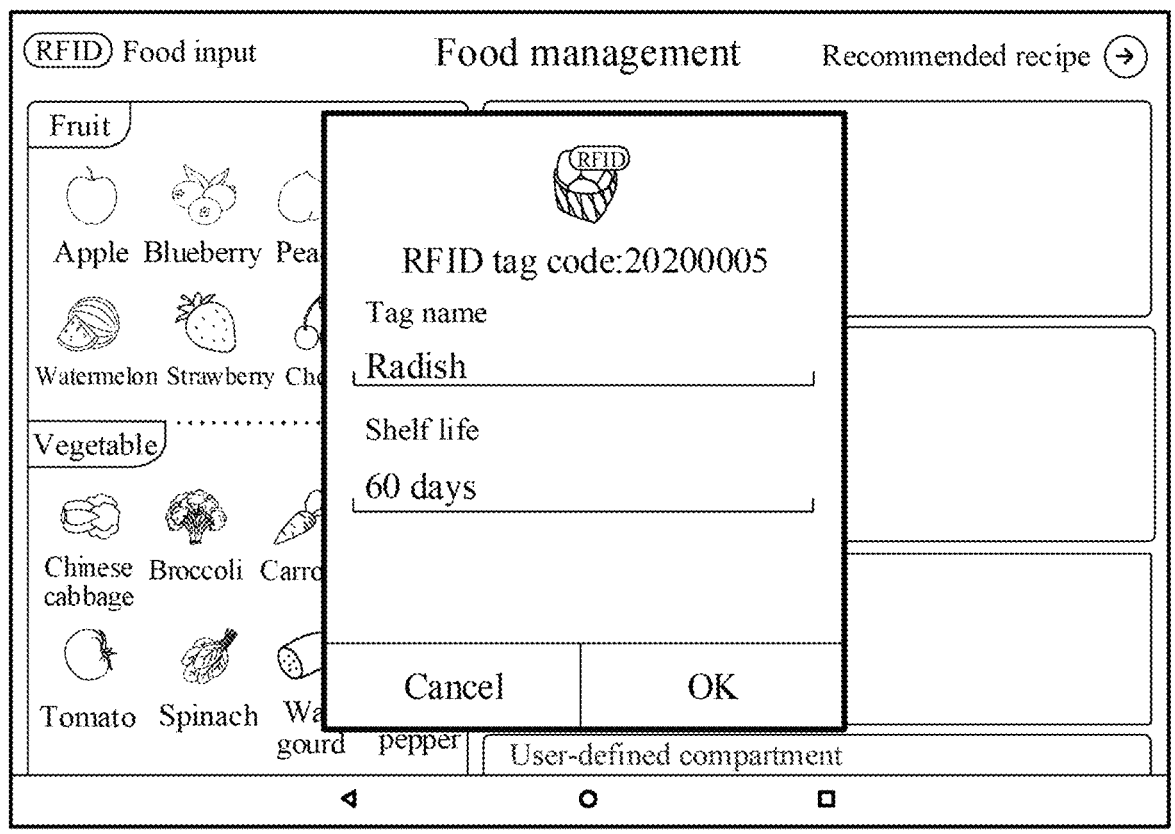
FIG. 12 shows another user interface according to an exemplary embodiment of the present application.

In some embodiments, if the first code portion is not the predetermined code, a second association interface including the preset food information is displayed on a display panel. Unlike the first association interface, the second association interface may be not allowed to receive food information input from the user. FIG. 12 shows a user interface according to an exemplary embodiment of the present application, which is specifically an exemplary second association interface. As shown in FIG. 12, a food name "radish" and a shelf life of "60 days" are displayed on the second association interface.

Figure 13:
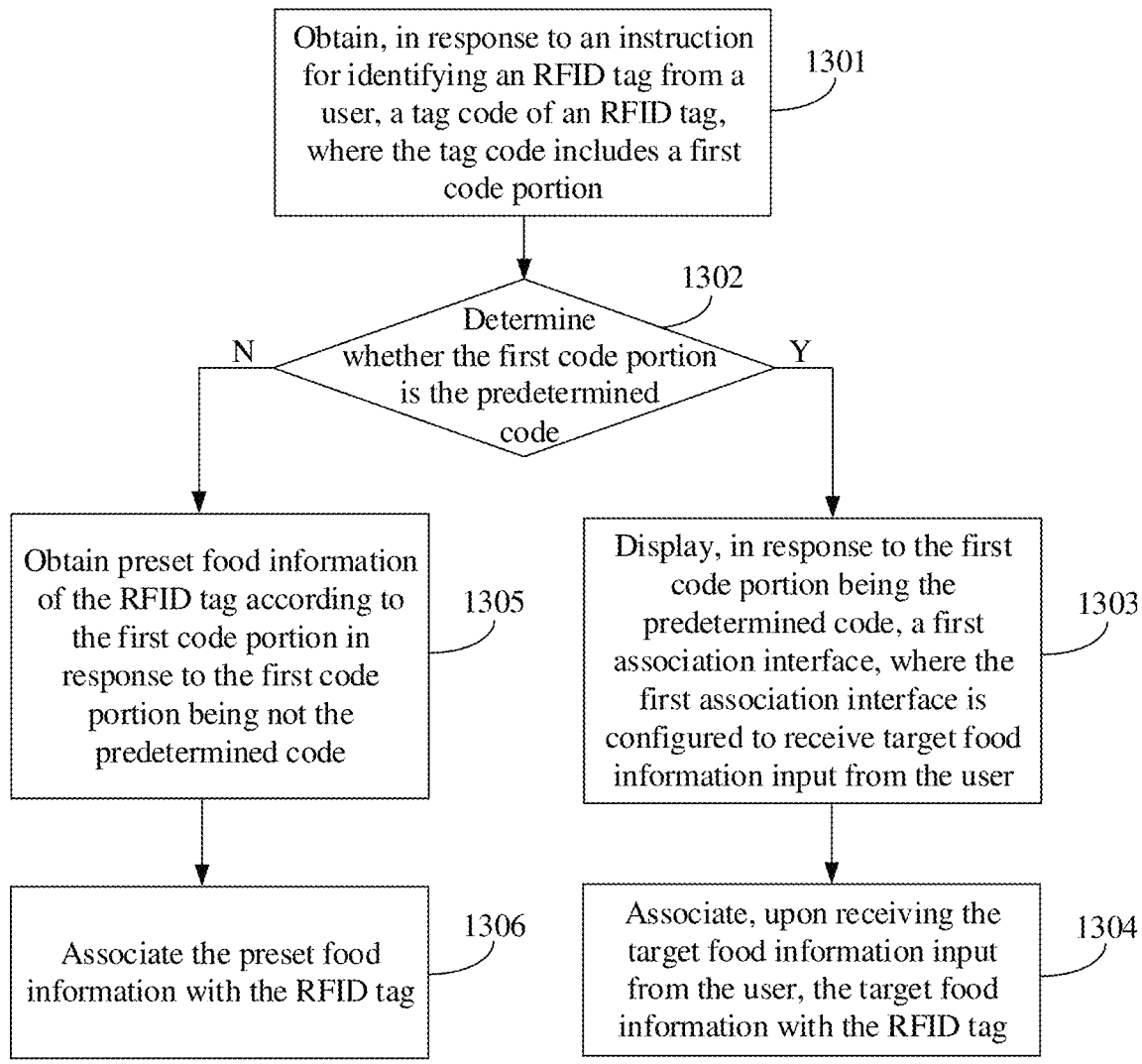
FIG. 13 shows a flowchart of a method for associating food information according to an exemplary embodiment of the present application.

An embodiment of the present application further provides a method for associating food information, the method is applied to the refrigerator as shown in FIGS. 1 to 6, and the method may be performed by a controller of the refrigerator. FIG. 13 shows a flowchart of a method for associating food information according to an exemplary embodiment of the present application. As shown in FIG. 13, the method may include the following.

Step 1301: in response to an instruction for identifying an RFID tag from a user, a tag code of an RFID tag is obtained, where the tag code includes a first code portion.

For example, the user may click the control for RFID tag identification on the interface shown in FIG. 3 to input an instruction to identify the RFID tag. In response to the instruction, an RFID detection module identifies a signal of the RFID tag to obtain a tag code of the RFID tag.

In this embodiment, the tag code includes a first code portion, and the first code portion is a predetermined code or a non-predetermined code, which indicates that preset food information corresponding to the RFID tag is pre-saved in a cloud server and may not be customized by the user.

In some embodiments, the tag code further includes a second code portion, and the second code portion is unique identity information of the RFID tag.

In some embodiments, the tag code of RFID tag includes at least two code segments, namely, a first code segment and a second code segment, which conform to a preset composition rule, where the first code segment is used for writing the first code portion and the second code segment is used for writing the second code portion. Based on this, after the tag code of RFID tag is obtained, the first code segment and/or the second code segment may be intercepted according to the preset composition rule for the tag code to obtain the first code portion and/or the second code portion.

Step 1302: whether the first code portion is the predetermined code is determined, if yes, the flow goes to step 1303, and otherwise, the flow goes to step 1305.

Step 1303: in response to the first code portion being the predetermined code, a first association interface is displayed, where the first association interface is configured to receive target food information input from the user.

In some embodiments of the present application, the first association interface includes one or more input positions for inputting one or more items of the target food information, and when a click at the input position from the user is detected, the input position is activated to receive text information, i.e., the target food information, input from the user. According to different elements and layouts on the first association interface, the target food information input from the user on the first association interface includes, but is not limited to, a name of the food, a shelf life of the food, etc.

As shown in FIG. 11, the exemplary first association interface is displayed, and the first association interface includes an input position for inputting a name of a food and an input position for inputting a shelf life of the food.

Step 1304: upon receiving the target food information input from the user, the target food information is associated with the RFID tag.

In some embodiments, associating the target food information with the RFID tag means that the identity information of the RFID tag and the target food information are correspondingly stored in local memory.

Step 1305: preset food information of the RFID tag is obtained according to the first code portion in response to the first code portion being not the predetermined code.

During specific implementations, preset food information may be obtained from a cloud server according to the first code portion. Alternatively, preset food information may be obtained from a local preset correspondence table between the first code portion and the food information according to the first code portion. The local preset correspondence table may be pre-downloaded from the cloud server.

Step 1306: the preset food information is associated with the RFID tag.

In some embodiments, associating the preset food information with the RFID tag means that the preset food information and the identity information of the RFID tag are correspondingly stored in local memory.

In the above embodiments, whether the food information corresponding to the RFID tag may be customized by the user is determined according to whether the first code portion is a predetermined code. If the first code portion is a predetermined code, it means that the food information corresponding to the RFID tag may be customized by the user. Therefore, the first association interface where the target food information may be input is displayed, and the received target food information corresponds to the RFID tag, thus improving use flexibility of the RFID tag. If the first code portion is not a predetermined code, it means that the food information corresponding to the RFID tag may not be customized by the user, then the corresponding preset food information is obtained according to the first code portion, and the preset food information corresponds to the RFID tag, thus saving operations of the user and improving input efficiency of the food information.

During specific implementations, the present application also provides non-volatile medium, where the non-volatile medium may store programs, and when executed, the programs may include some or all steps in the embodiments of the control method for the refrigerator according to the present application. The non-volatile medium may be a magnetic disk, an optical disk, a read-merely memory (ROM) or a random access memory (RAM), etc.

For convenience of explanation, the above description has been made in conjunction with specific embodiments. However, the above exemplary discussion is not intended to be exhaustive or to limit the implementation manners to the specific forms disclosed above. Various modifications and variations can be derived based on the above teachings. The above implementations have been chosen and described to better explain principles and practical applications, such that those skilled in the art may make better use of the implementations and various modifications suitable for specific use.

What is claimed is:

1. A refrigerator, comprising:
   one or more storage compartments, configured to store foods, wherein the foods are able to be identified by radio frequency identification (RFID) tags;
   one or more doors corresponding to the one or more storage compartments, provided at one or more openings for the one or more storage compartments;
   one or more RFID detection circuits in the one or more storage compartments, configured to detect signals from the RFID tags;
   a display panel at one of the one or more doors; and
   a controller in communication with the display panel, configured to:
   in response to that the one or more doors are all detected to be closed, obtain a first set of information, wherein the first set of information comprises identity information of each RFID tag in the one or more storage compartments;
   determine, by comparing the first set of information with a second set of information, one or more target tags from among the RFID tags placed in a first storage compartment of the one or more storage compartments, and determine one or more target placement times corresponding to the one or more target tags according to a current time of the refrigerator, wherein the second set of information is a set of information generated according to identity information of each RFID tag in the one or more storage compartments obtained in response to that the one or more doors are detected to be closed last time; and
   display, on the display panel, a freshness indicator of one or more foods identified by the one or more target tags and placed in the first storage compartment, wherein the freshness indicator is generated according to the one or more target placement times corresponding to the one or more target tags,
   wherein the controller is further configured to:
   in response to an instruction for identifying an RFID tag from a user, obtain a tag code of the RFID tag for identifying, the tag code comprising a first code portion;
   determine whether the first code portion is a predetermined code;
   in response to the first code portion being the predetermined code,
   display a first association interface on the display panel to receive first food information that is input from the user,
   upon receiving the first food information from the user, associate the first food information with the RFID tag having the tag code, and
   store the associated first food information and the RFID tag having the tag code; and
   in response to the first code portion not being the predetermined code,
   obtain second food information for the RFID tag having the tag code according to the first code portion from a local memory,
   display the second food information on a second association interface on the display panel, the second association interface being configured unable to receive food information input from the user; and associate the second food information with the RFID tag having the tag code.

2. The refrigerator according to claim 1, wherein the one or more target tags comprise a target tag whose identity information exists in the first set of information and does not exist in the second set of information; and a target placement time corresponding to the target tag is the current time of the refrigerator.

3. The refrigerator according to claim 1, wherein the one or more target tags comprise a first target tag whose identity information exists in the first set of information and the second set of information and is marked with a removed state in the second set of information.

4. The refrigerator according to claim 3, wherein the controller is further configured to:

determine the current time as a target placement time corresponding to the first target tag in response to that a time difference between the current time and removal time corresponding to the first target tag is greater than a preset threshold;

determine a last placement time corresponding to the first target tag as a target placement time corresponding to the first target tag in response to that a time difference between the current time and removal time corresponding to the first target tag is not greater than the preset threshold.

5. The refrigerator according to claim 1, wherein the one or more target tags comprise a target tag whose identity information exists in the first set of information and the second set of information and is marked with a re-association state in the first set of information, and the re-association state indicates that food information currently associated with the target tag is different from last associated food information immediately before the one or more doors are detected to be closed.

6. The refrigerator according to claim 1, wherein the tag code further comprises a second code portion, and the controller is further configured to:

associate the first food information or the second food information with the second code portion of the RFID tag having the tag code, and store the associated first food information or second food information and second code portion of the RFID tag having the tag code in the local memory.

7. The refrigerator according to claim 6, wherein the controller is further configured to:

determine whether third food information associated with the RFID tag having the tag code exists in the local memory according to the second code portion;

in response to the third food information associated with the RFID tag having the tag code existing in the local memory, pre-fill a preset input position on the first association interface with the third food information associated with the RFID tag having the tag code; and in response to the third food information associated with the RFID tag having the tag code not existing in the local memory, pre-fill the preset input position on the first association interface with a preset character.

8. A control method for a refrigerator, comprising:

in response to that one or more doors corresponding to one or more storage compartments of the refrigerator are all detected to be closed, obtaining a first set of information, wherein the one or more storage compartments store foods that are identified by radio frequency identification (RFID) tags, the first set of information comprises identity information of each RFID tag in the one or more storage compartments, and the one or more doors are provided at one or more openings of the one or more storage compartments;

by comparing the first set of information with a second set of information, determining one or more target tags from among the RFID tags placed in a first storage compartment of the one or more storage compartments, and determining one or more target placement times corresponding to the one or more target tags according to a current time of the refrigerator, wherein the second set of information is a set of information generated according to identity information of each RFID tag in the one or more storage compartments obtained in response to that the one or more doors are detected to be closed last time;

displaying, on a display panel, a freshness indicator of one or more foods identified by the one or more target tags and placed in the first storage compartment, wherein the freshness indicator is generated according to the one or more target placement times corresponding to the one or more target tags, and the display panel is disposed at one of the one or more doors;

in response to an instruction for identifying an RFID tag from a user, obtaining a tag code of the RFID tag for identifying, the tag code comprising a first code portion;

determining whether the first code portion is a predetermined code;

in response to the first code portion being the predetermined code, displaying a first association interface on the display panel to receive first food information that is input from the user, upon receiving the first food information from the user, associating the first food information with the RFID tag having the tag code, and storing the associated first food information and the RFID tag having the tag code; and in response to the first code portion not being the predetermined code, obtaining second food information for the RFID tag having the tag code according to the first code portion from a local memory, displaying the second food information on a second association interface on the display panel, the second association interface being configured unable to receive food information input from the user; and associating the second food information with the RFID tag having the tag code.

9. The control method according to claim 8, wherein the one or more target tags comprise a target tag whose identity information exists in the first set of information and does not exist in the second set of information; and a target placement time corresponding to the first target tag is the current time.

10. The control method according to claim 8, wherein the one or more target tags comprise a first target tag whose identity information exists in the first set of information and the second set of information and is marked with a removed state in the second set of information.

11. The control method according to claim 10, further comprising:

determining the current time as a target placement time corresponding to the first target tag in response to that a time difference between the current time and removal time corresponding to the first target tag is greater than a preset threshold;

determining a last placement time corresponding to the first target tag as a target placement time corresponding to the first target tag in response to that a time difference between the current time and removal time corresponding to the first target tag is not greater than the preset threshold.

12. The control method according to claim 8, wherein the one or more target tags comprise a target tag whose identity information exists in the first set of information and the second set of information and is marked with a re-association state in the first set of information, and the re-association state indicates that food information currently associated with the target tag is different from last associated food information immediately before the one or more doors are detected to be closed.

13. The control method according to claim 8, wherein the tag code further comprises a second code portion, and the method further comprises:

associating the first food information or the second food information with the second code portion of the RFID tag having the tag code, and storing the associated first food information or second food information and second code portion of the RFID tag having the tag code in the local memory.

14. The control method according to claim 13, further comprising:

determining whether third food information associated with the RFID tag having the tag code exists in the local memory according to the second code portion;

in response to that the third food information associated with the RFID tag having the tag code exists in the local memory, pre-filling a preset input position on the first association interface with the third food information; and in response to that food information associated with the RFID tag having the tag code does not exist in the local memory, pre-filling the preset input position on the first association interface with a preset character.

* * * * *